United States Patent

McInnes et al.

[11] Patent Number: 5,372,242
[45] Date of Patent: Dec. 13, 1994

[54] AIR BLOW-OFF SHROUD

[75] Inventors: Robert P. McInnes, Boynton Beach, Fla.; Marc B. Myers, Holt, Ala.

[73] Assignee: LubeCon Systems, Inc., Fremont, Mich.

[21] Appl. No.: 88,438

[22] Filed: Jul. 7, 1993

[51] Int. Cl.$^5$ .............................................. B65G 45/00
[52] U.S. Cl. ................................................... 198/495
[58] Field of Search ................................. 198/494, 495

[56] References Cited

U.S. PATENT DOCUMENTS

| | | | |
|---|---|---|---|
| 1,380,563 | 6/1921 | Keebler | 198/495 |
| 2,516,499 | 7/1950 | Albright | 198/495 |
| 2,885,068 | 5/1959 | Bishop | 198/495 |
| 3,017,986 | 1/1962 | Ackles | 198/495 |
| 3,454,150 | 7/1969 | Johnson | 198/494 X |
| 3,563,203 | 2/1971 | Stiltner | 198/495 X |
| 3,819,032 | 6/1974 | Preuss et al. | 198/495 |
| 3,856,135 | 12/1974 | Hayakawa et al. | 198/860.5 |
| 3,910,400 | 10/1975 | Hishitani | 198/494 X |
| 4,051,211 | 9/1977 | Beser et al. | 198/495 X |
| 4,064,970 | 12/1977 | Reeves | 184/15 B |
| 4,630,712 | 12/1986 | Hoseley | 184/15.3 |
| 4,862,996 | 9/1989 | Chisholm | 184/15.1 |
| 4,960,200 | 10/1990 | Pirce | 198/495 |
| 5,058,728 | 10/1991 | Leiweke et al. | 198/495 |

*Primary Examiner*—D. Glenn Dayoan
*Attorney, Agent, or Firm*—Warner, Norcross & Judd

[57] ABSTRACT

A shroud to contain contaminants removed from a conveyor chain during cleaning with pressurized air. The shroud is substantially enclosed except for chain ingress and egress openings and a contaminant discharge opening. The shroud includes a top hinged to a bottom. The top supports the air nozzles and the bottom defines the discharge opening.

9 Claims, 1 Drawing Sheet

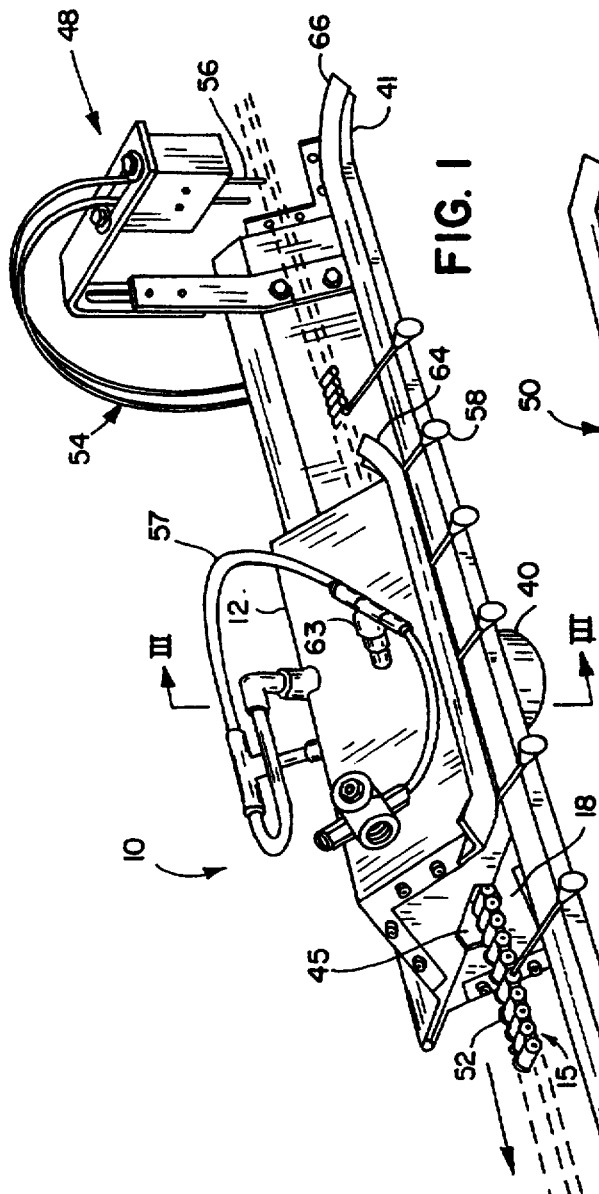
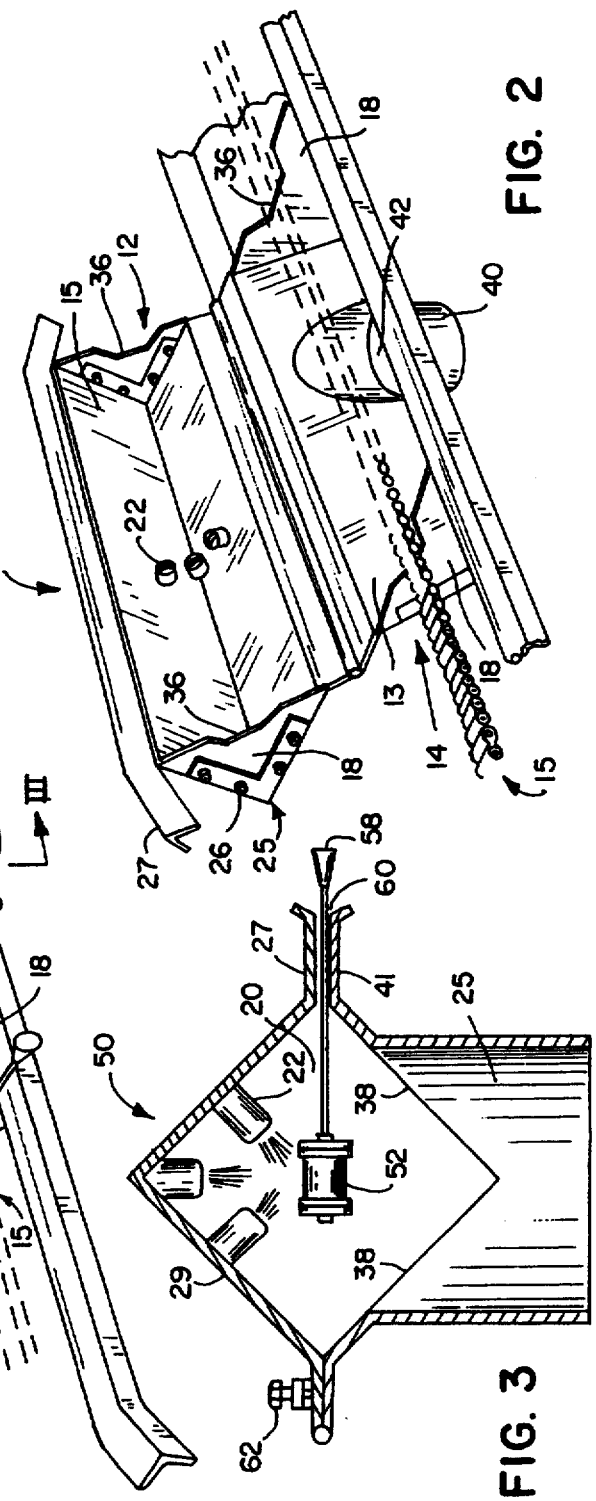
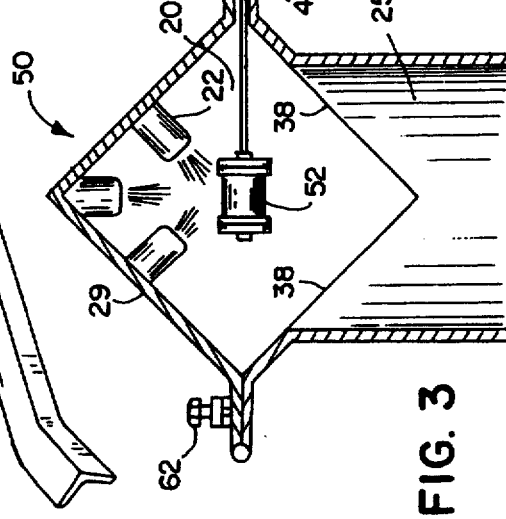
FIG. 1
FIG. 2
FIG. 3

AIR BLOW-OFF SHROUD

BACKGROUND OF THE INVENTION

The present invention relates to equipment for lubricating and cleaning chain conveyors and more particularly to such equipment using compressed air.

Chain conveyors commonly are used in a wide variety of industries, such as paint lines, bottling/canning lines, and can manufacturing. To increase the life of a chain conveyor, it is necessary to intermittently lubricate and to clean the chain. Unfortunately, any excess lubricant will collect on the chain. The excess lubricant slings off during travel, contaminating the conveyed articles and/or their contents. In addition, dirt will collect on the chain conveyor, bonding with the excess lubricant.

It is known in the art to use pressurized air to blow excess lubricant and contaminants off the chain of the conveyor. An example of this technique is illustrated in U.S. Pat. No. 4,630,712, issued Dec. 23, 1986 to Hoseley and entitled, "Automatic Chain Lubricating System." However, the pressurized air blows the oil and contaminants in all directions, thus creating a mess.

SUMMARY OF THE INVENTION

These problems are overcome in the present invention wherein a shroud is provided to contain and to channel lubricants and contaminants blown off the chain. The shroud defines a chamber which is substantially closed except for chain ingress and egress openings and a discharge opening for the contaminants. Compressed air nozzles are located within the shroud and are directed onto the chain passing through the chamber to blow excess lubricant and contaminants from the chain. These collected materials are channeled from the chamber through the discharge opening for orderly disposal.

In a preferred embodiment, the shroud comprises a bottom and a top hingedly mounted on the bottom. Both the top and the bottom are elongated along the direction of travel of the chain conveyor. The top and bottom include end walls, each of which defines an aperture through which the chain conveyor enters and leaves the chamber. In addition, a gap is provided between the top and bottom to permit spindles attached to the chain conveyor to pass through the shroud. The apertures are dimensioned to accommodate closely the chain conveyor, in order to reduce the likelihood of any contaminants escaping the chamber through these openings.

In operation, the chain conveyor passes through the chamber. The pressurized air from the air nozzles disposed in the top cover blows excess lubricants and other contaminants off the chain conveyor. The contaminants are contained within the chamber by the shroud. The contaminants thus removed are channeled downward by the bottom's concave shape. Eventually, the contaminants reach the vent in the bottom from where they exit the chamber and are collected in a suitable container positioned underneath the vent for convenient disposal.

The features and advantages of the present invention will be further understood by reference to the Detailed Description of the Preferred Embodiment and the drawings.

BRIEF DESCRIPTION OF THE DRAWINGS

FIG. 1 is a perspective view of the air blow-off shroud of the present invention including a lubricating station;

FIG. 2 is a perspective view of the shroud with its top pivoted upward on its hinges away from the bottom;

FIG. 3 is a cross-sectional view of the shroud and chain conveyor passing therethrough taken along the line III—III in FIG. 1.

DETAILED DESCRIPTION OF PREFERRED EMBODIMENTS

By way of disclosing a preferred embodiment, and not by way of limitation, there is shown in FIG. 1 the shroud 10 of the present invention.

Referring now to FIG. 2, the shroud is comprised of a top 12 and a bottom 14, both of which are elongated along the direction of travel of a chain conveyor 15. The top 12 is hingedly mounted on the bottom 14, thus defining a chamber 20 in between the top cover and bottom cover. The top 12 and bottom 14 include end walls 18 defining an aperture through which the chain conveyor enters and leaves the chamber 20.

A preferred configuration of the top 12 and bottom 14 will now be described. The top 12 ideally is manufactured of steel, and is concave, having for example a v-shaped cross-section as shown in FIG. 3. Air nozzles 22 are mounted within holes 23 in the top 12 with the lowest extent of the air nozzles 22 disposed above the chain conveyor 15. Therefore, at least one of the top 12 and the bottom 14 defines a hole for receiving an air nozzle 22. The top has half end walls 18 at both of its longitudinally opposite ends. Preferably, the end walls 18 are manufactured of rubber and are removably secured to the top 12 by means of a bracket 25 and screws 26 therethrough for insertion into the side 29 of the top 12. The half end walls each have a notch 36. A top rail 27 is attached to the top 12.

The bottom 14 also is ideally manufactured of steel, and is concave, having for example the v-shaped cross-section shown in FIG. 3. Due to the concave shape, contaminants reaching the sides 38 of the bottom 14 are channeled downward towards the vent 40. As shown in FIGS. 2 and 3, the vent 40 defines a hole 42 from which contaminants can drain out of the chamber 20. The half end walls 18 are connected to the bottom 14 in the same manner that the top half end walls are connected to the top 12. The bottom half end walls also each have a notch 36. A bottom rail 41 is attached to the bottom 14.

As shown in FIG. 1, when the top 12 is closed on the bottom 14, the half end walls 18 at each longitudinally opposite end of the shroud 10 together define an aperture 45 formed by the juxtaposition of the notches 36 of the half end walls 18. The chain conveyor enters and exits the chamber 20 through the apertures 45.

The shroud 10 is located along the chain conveyor 15, which moves downstream from a lubricant applicator 48 to the shroud 10. In practice, a chain 15 passes under the lubricant applicator 48. Lubricant supply lines 54 supply lubricant to lubricant nozzles 56, which then apply lubricant to the chain 15. After application of the lubricant, the chain 15 may be covered with excess lubricant as well as other contaminants. The chain 15 travels downstream from the applicator 48 to the shroud 10.

Spindles 58 connected to the chain conveyor 15 carry the product being conveyed. The shroud 10 therefore must allow the spindles 58 to pass through the shroud. Accordingly, a gap 60 is provided between the top rail 27 and the bottom rail 41. The gap may be enlarged or shrunk by loosening or tightening two adjustment screws 62 which are provided with lock nuts. The top rail 27 and bottom rail 41 have curved ends 64, 66 which are curved upward and downward, respectively. Thus, if a spindle 58 is vertically displaced, the top rail 27 or the bottom rail 41 guide the spindles into the gap 60

The cleaning of the chain 15 in the chamber 20 will now be described as shown in FIGS. 1 and 3. Pressurized air is supplied via air lines 57 to air nozzles 22 which are held within holes in the top 12 by air fittings 63. Air pressurized to 80 p.s.i. has been found to be effective in blowing off excess lubricant and other contaminants from the chain conveyor 15. As the chain 15 passes underneath the air nozzles 22, the chain is blasted by pressurized air, which removes contaminants from all parts of the chain 15 and is particularly effective in removing contaminants from crevices in between links. The force of the pressurized air tends to blast contaminants off the link, but the contaminants are trapped within the chamber 20 by the shroud 10.

Contaminants thus removed tend to fall or slide downward, aided by the downward slope of the sides 38 of the bottom 14. Contaminants thus reach the hole 42 of the vent 40, thereby draining out of the chamber 20 to be conveniently collected in a container positioned underneath the vent 40 for easy disposal.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. An apparatus for cleaning a chain conveyor, the apparatus comprising:
   a shroud having a bottom defining a vent for draining residue from said shroud, said shroud further having a top mounted on said bottom, said top defining a hole for receiving an air nozzle;
   an air nozzle disposed through said hole for directing air onto the conveyor chain to clean the chain conveyor;
   a supply of compressed air connected to said air nozzle; and
   said top and said bottom collectively defining an end wall at each end of said top and said bottom, each end wall formed of a pliable, resilient material and defining an aperture for allowing a chain conveyor to pass through said shroud.

2. The apparatus of claim 1:
   wherein the chain conveyor includes at least one spindle;
   wherein said top and said bottom further include top and bottom rails, respectively, said top rail and said bottom rail defining a gap for allowing said at least one spindle to pass through the shroud; and
   further comprising adjusting means for adjusting the width of said gap.

3. The apparatus of claim 2, wherein said adjusting means includes at least one adjustment screw extending through at least one of said top and said bottom opposite said gap.

4. An air blow-off unit for cleaning a chain conveyor including a chain and a plurality of spindles extending laterally therefrom, said unit comprising:
   a substantially enclosed shroud having upper and lower portions, a pair of opposite ends, and a side portion extending between said ends, one of said ends defining a chain ingress opening, the other of said ends defining a chain egress opening, said chain ingress and egress openings defining the endpoints of a linear chain path along which the chain travels through said shroud, said side portion defining a slot extending from one end to the other end, said slot receiving and conveying the chain spindles as the chain travels through said shroud, said lower portion defining a contaminant discharge opening; and
   air nozzle means for directing compressed air onto said linear chain path and consequently onto the chain passing through said shroud, whereby excess lubricant and contaminants removed from the chain by the compressed air are contained within said shroud for discharge through said discharge opening.

5. The air blow off unit of claim 4, further comprising adjustment means for adjusting the width of said slot.

6. A shroud for covering a conveyor chain having at least one spindle while the chain conveyor is cleaned, the shroud comprising:
   a bottom having a vent for draining residue from the shroud, said bottom further including a pair of opposite bottom ends and a lower end wall portion at each of said bottom ends;
   a top removably mounted on said bottom, said top including a pair of opposite top ends and an upper end wall portion at each of said top ends, the upper wall portion and the lower wall portion at each end of said shroud cooperating to define an end wall in turn defining a chain aperture for allowing a conveyor chain to pass through said shroud along a linear chain path between said chain apertures, said top and said bottom further including top and bottom rails, respectively, together defining a slot extending between said ends, said slot receiving and conveying the spindles on the conveyor chain as the chain passes through the shroud;
   adjusting means for adjusting the width of said gap; and
   an air nozzle directed onto the linear chain path, whereby excess lubricant on a conveyor chain moving through said shroud can be removed by air from said air nozzle to exit said shroud through said vent.

7. The shroud of claim 6, wherein said slot includes an entrance end, each of said top and said bottom rails curving away from one another at said entrance end to facilitate entrance of the spindles into said slot.

8. The shroud of claim 7, wherein said adjusting means includes at least one adjustment screw extending through at least one of said top and said bottom opposite said gap.

9. A shroud for covering a conveyor chain while the chain conveyor is cleaned, the shroud comprising:
   a bottom having a vent for draining residue from the shroud, said bottom further including a pair of opposite bottom ends and a lower end wall portion at each of said bottom ends;
   a top removably mounted on said bottom, said top including a pair of opposite top ends and an upper end wall portion at each of said top ends, each end wall portion comprising a pliable, resilient material;

said upper wall portion and said lower wall portion at each end of said shroud cooperating to define an end wall in turn defining a chain aperture for allowing a conveyor chain to pass through said shroud along a linear chain path between said chain apertures; and an air nozzle directed onto the linear chain path, whereby excess lubricant on a conveyor chain moving through said shroud can be removed by air from said air nozzle to exit said shroud through said vent.

* * * * *